US012111604B2

(12) United States Patent
Kim et al.

(10) Patent No.: US 12,111,604 B2
(45) Date of Patent: Oct. 8, 2024

(54) STRUCTURE FOR MOUNTING DEVELOPMENT CARTRIDGE IN IMAGE FORMING APPARATUS

(71) Applicant: Hewlett-Packard Development Company, L.P., Spring, TX (US)

(72) Inventors: Younghoon Kim, Seongnam Si (KR); Wontaek Kim, Seongnam-si (KR); Hohyun Hwang, Seongnam-si (KR); Hwanghee Ryu, Seongnam-si (KR); Saehoon Han, Seongnam-si (KR); Seongho Park, Seongnam-si (KR); Seunggweon Lee, Seongnam-si (KR); Woongyong Choi, Seongnam-si (KR); Sungjin Kim, Seongnam-si (KR); Junhui Kim, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/031,223

(22) PCT Filed: Apr. 12, 2021

(86) PCT No.: PCT/US2021/026794
§ 371 (c)(1),
(2) Date: Apr. 11, 2023

(87) PCT Pub. No.: WO2022/081200
PCT Pub. Date: Apr. 21, 2022

(65) Prior Publication Data

US 2023/0375974 A1 Nov. 23, 2023

(30) Foreign Application Priority Data

Oct. 14, 2020 (KR) ........................ 10-2020-0132951

(51) Int. Cl.
*G03G 15/08* (2006.01)
*G03G 21/16* (2006.01)
*G03G 21/18* (2006.01)

(52) U.S. Cl.
CPC ..... *G03G 21/1647* (2013.01); *G03G 21/1676* (2013.01); *G03G 21/1842* (2013.01)

(58) Field of Classification Search
CPC ........... G03G 21/1619; G03G 21/1623; G03G 21/1633; G03G 21/1647; G03G 21/1676; G03G 21/1842; G03G 2221/1869
See application file for complete search history.

(56) References Cited

U.S. PATENT DOCUMENTS

| | | | |
|---|---|---|---|
| 7,715,765 | B2 | 5/2010 | Ichikawa et al. |
| 2008/0159772 | A1 | 7/2008 | Koishi et al. |

(Continued)

FOREIGN PATENT DOCUMENTS

| | | | |
|---|---|---|---|
| JP | 2008-165025 | A | 7/2008 |
| JP | 2012-014154 | A | 1/2012 |
| WO | 2019/142974 | A1 | 7/2019 |

*Primary Examiner* — Hoang X Ngo
(74) *Attorney, Agent, or Firm* — Brooks, Cameron & Huebsch, PLLC

(57) ABSTRACT

An example image forming apparatus includes a main body including an opening and an accommodation portion, a development cartridge detachable from the main body, a tray on which to mount the development cartridge, the tray being movable between a mounting position inserted into the main body through the opening, a withdrawal position extracted from the main body, and an accommodation position at which the development cartridge is accommodated in the accommodation portion, and an elastic support member to elastically support the development cartridge with respect to the tray while the tray moves between the mounting position, the withdrawal position, and the accommodation position.

15 Claims, 14 Drawing Sheets

(56) References Cited

U.S. PATENT DOCUMENTS

| | | | |
|---|---|---|---|
| 2008/0159773 A1 | 7/2008 | Murayama et al. | |
| 2011/0123223 A1 | 5/2011 | Koishi et al. | |
| 2011/0299881 A1 | 12/2011 | Tateishi | |
| 2014/0126929 A1 | 5/2014 | Tomatsu | |
| 2016/0231700 A1 | 8/2016 | Sato | |
| 2017/0261880 A1 | 9/2017 | Miyamoto | |
| 2018/0074453 A1 | 3/2018 | Mushika et al. | |
| 2018/0136603 A1* | 5/2018 | Watanabe | G03G 21/168 |
| 2018/0307179 A1 | 10/2018 | Lee et al. | |

* cited by examiner

STRUCTURE FOR MOUNTING DEVELOPMENT CARTRIDGE IN IMAGE FORMING APPARATUS

BACKGROUND

An image forming apparatus using an electrophotographic method supplies toner to an electrostatic latent image formed on a photoconductor to form a visible toner image on the photoconductor, transfers the visible toner image to a printing medium, and fixes the transferred visible toner image on the printing medium to print an image on the printing medium.

A development cartridge is an assembly of parts for forming a visible toner image. The development cartridge is a consumable that is replaceable at the end of its service life and is detachable from a main body of an image forming apparatus for purposes of replacement. A drawer type member that is withdrawable from the image forming apparatus may be provided in the main body. The drawer type member may be withdrawn from the main body, the development cartridge may be mounted on the drawer type member, and the drawer type member may be pushed into the main body. Thus, the development cartridge may be mounted on the main body. Also, the drawer type member on which the development cartridge is mounted may be withdrawn from the main body and the development cartridge may be removed from the drawer type member. Thus, the development cartridge may be removed from the main body.

BRIEF DESCRIPTION OF THE DRAWINGS

FIGS. 3 and 4 are side views illustrating a structure in which a tray moves between a mounting position and an accommodation position respectively in conjunction with an opening and closing operation of a door according to an example, wherein FIG. 3 illustrates the door that is opened and the tray that is positioned at the mounting position, and FIG. 4 illustrates the door that is closed and the tray that is positioned at the accommodation position.

FIGS. 11 and 12 are schematic diagrams of an elastic support member according to an example, wherein FIG. 11 illustrates a tray positioned at a mounting position, and FIG. 12 illustrates the tray positioned at an accommodation position.

FIGS. 13 and 14 are schematic diagrams of an elastic support member according to an example, wherein FIG. 13 illustrates a tray positioned at a mounting position, and FIG. 14 illustrates the tray positioned at an accommodation position.

FIGS. 15 and 16 are schematic diagrams of an elastic support member according to an example, wherein FIG. 15 illustrates a tray positioned at a mounting position, and FIG. 16 illustrates the tray positioned at an accommodation position.

FIGS. 17 and 18 are schematic diagrams of an elastic support member according to an example, wherein FIG. 17 illustrates a tray positioned at a mounting position, and FIG. 18 illustrates the tray positioned at an accommodation position.

FIGS. 19 and 20 are side views illustrating a non-elastic support member according to an example, wherein FIG. 19 illustrates a tray positioned at a mounting position, and FIG. 20 illustrates the tray positioned at an accommodation position.

DETAILED DESCRIPTION OF EXAMPLES

Figure 1:
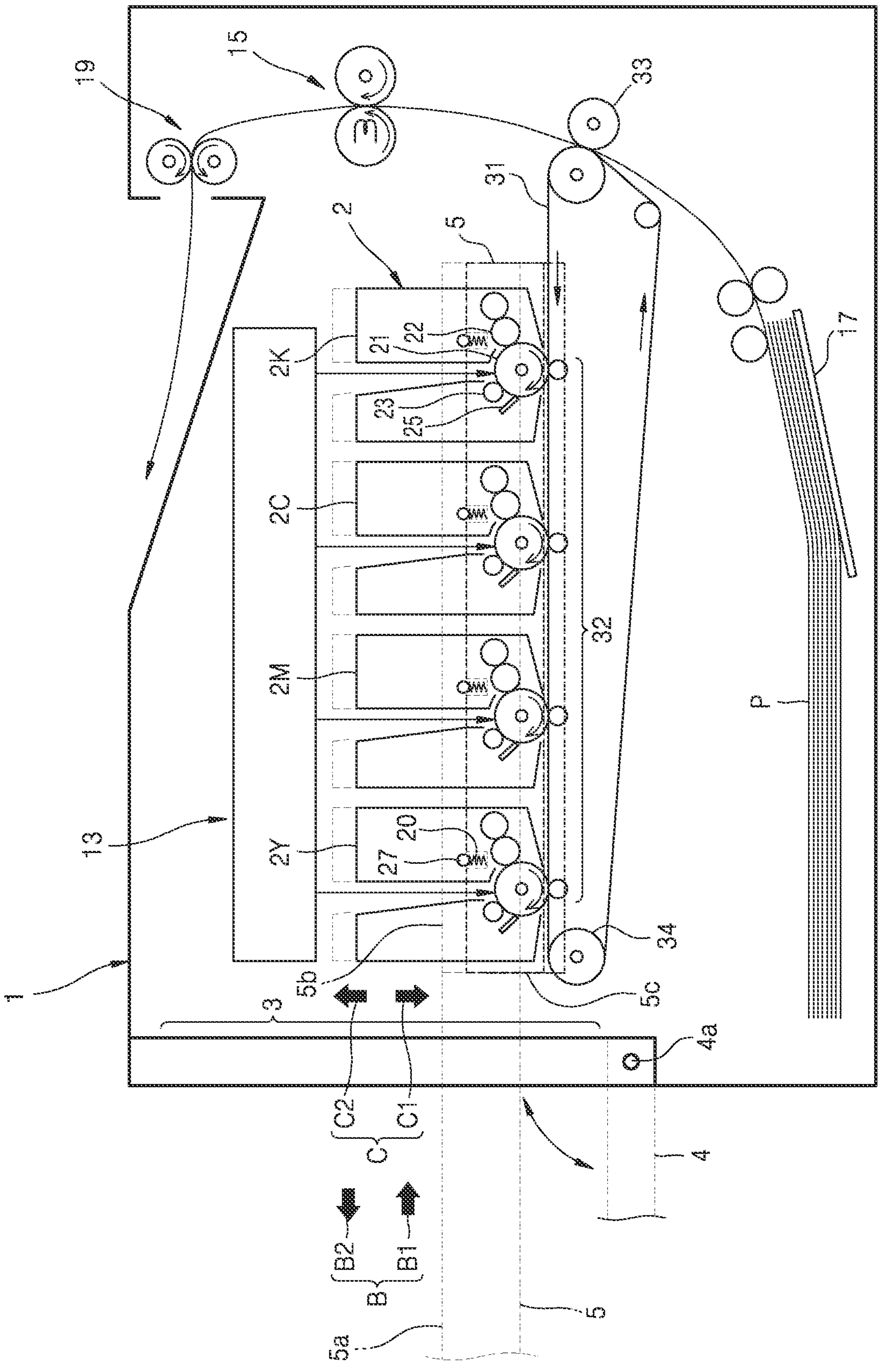
FIG. 1 is a schematic diagram of an electrophotographic image forming apparatus according to an example.

An example image forming apparatus includes a replaceable development cartridge. The image forming apparatus may include a tray on which the development cartridge may be mounted. The tray may move between a mounting position, in which the tray is inserted into a main body of the image forming apparatus, and a withdrawal position, in which the tray is extracted from the main body. The tray may descend from the mounting position to an accommodation position. The development cartridge may be lowered together with the tray and accommodated in an accommodation portion provided in the main body.

An impact may be applied to the tray while the tray is sliding between the mounting position and the withdrawal position and/or descending/ascending in the mounting position. This impact may be transferred to the development cartridge. As an example, the impact may occur when the tray moves and then stops. For example, when the tray slides from the withdrawal position to reach the mounting position, the tray may come into contact with a stopper provided in the main body and stop at the mounting position. At this time, impact may occur on the tray. This impact may be transferred to the development cartridge mounted on the tray and may cause a positional change of the development cartridge in the tray. When a position of the development cartridge does not remain stable in the tray, the development cartridge may not be stably accommodated in the accommodation portion when the tray descends to the accommodation position. In addition, the development cartridge may be shaken by an impact occurring when the tray descends from the mounting position and reaches the accommodation position and may not be stably accommodated in the accommodation portion. Because an image forming operation is performed while the development cartridge is accommodated in the accommodation portion, when the development cartridge is not stably accommodated in the accommodation portion, the transfer efficiency may deteriorate, and a color registration error may occur in case of color printing.

According to an example, the development cartridge may be attached to and detached from the main body including an opening and the accommodation portion. The tray may mount the development cartridge thereon and move between the mounting position inserted into the main body, the withdrawal position withdrawn from the main body, and the accommodation position at which the development cartridge is accommodated in the accommodation portion through the opening. While the tray moves between the withdrawal position, the mounting position, and the accommodation position, the development cartridge may be elastically supported against the tray by an elastic support member. In an example, an impact that occurs while the tray moves and reaches the mounting position or the accommodation position and stops is buffered by the elastic support member. Thus, the positional stability of the development cartridge in the tray may be secured. Therefore, the development cartridge may be stably accommodated in the accommodation portion and uniform image quality may be ensured.

In an example, the development cartridge may include a driving end and a non-driving end. The driving end may include an end to receive a driving force from the main body and the non-driving end may include an end opposite to the driving end. The elastic support member may elastically support the driving end and the non-driving end with respect to the tray. The elastic support member may elastically support the non-driving end with respect to the tray. The driving end may be supported against the tray by a non-elastic support member. That is, the driving end may remain in contact with the tray by the non-elastic support member. The tray may move between the mounting position and the accommodation position in conjunction with an opening and closing operation of a door. For example, the image forming apparatus may include an elevating guide member that is elevated to a first position at which the tray is supported to slide between the mounting position and the withdrawal position, and a second position at which the development cartridge is accommodated in the accommodation portion in conjunction with the opening and closing operation of the door. Hereinafter, examples of an image forming apparatus will be described with reference to the accompanying drawings. In the following description, elements having substantially the same function are denoted by the same reference numerals, and thus redundant descriptions may be omitted.

Figure 2:
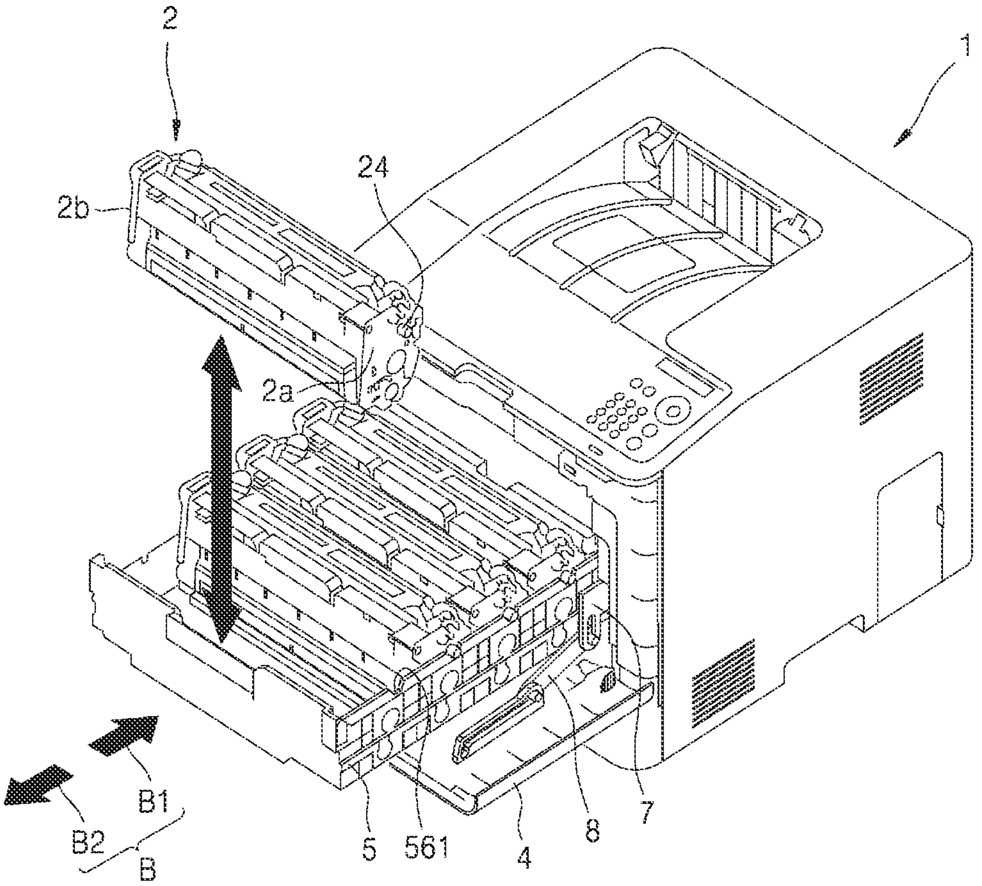
FIG. 2 is a perspective view illustrating a method of mounting/removing a development cartridge on/from a main body according to an example.
Figure 3:
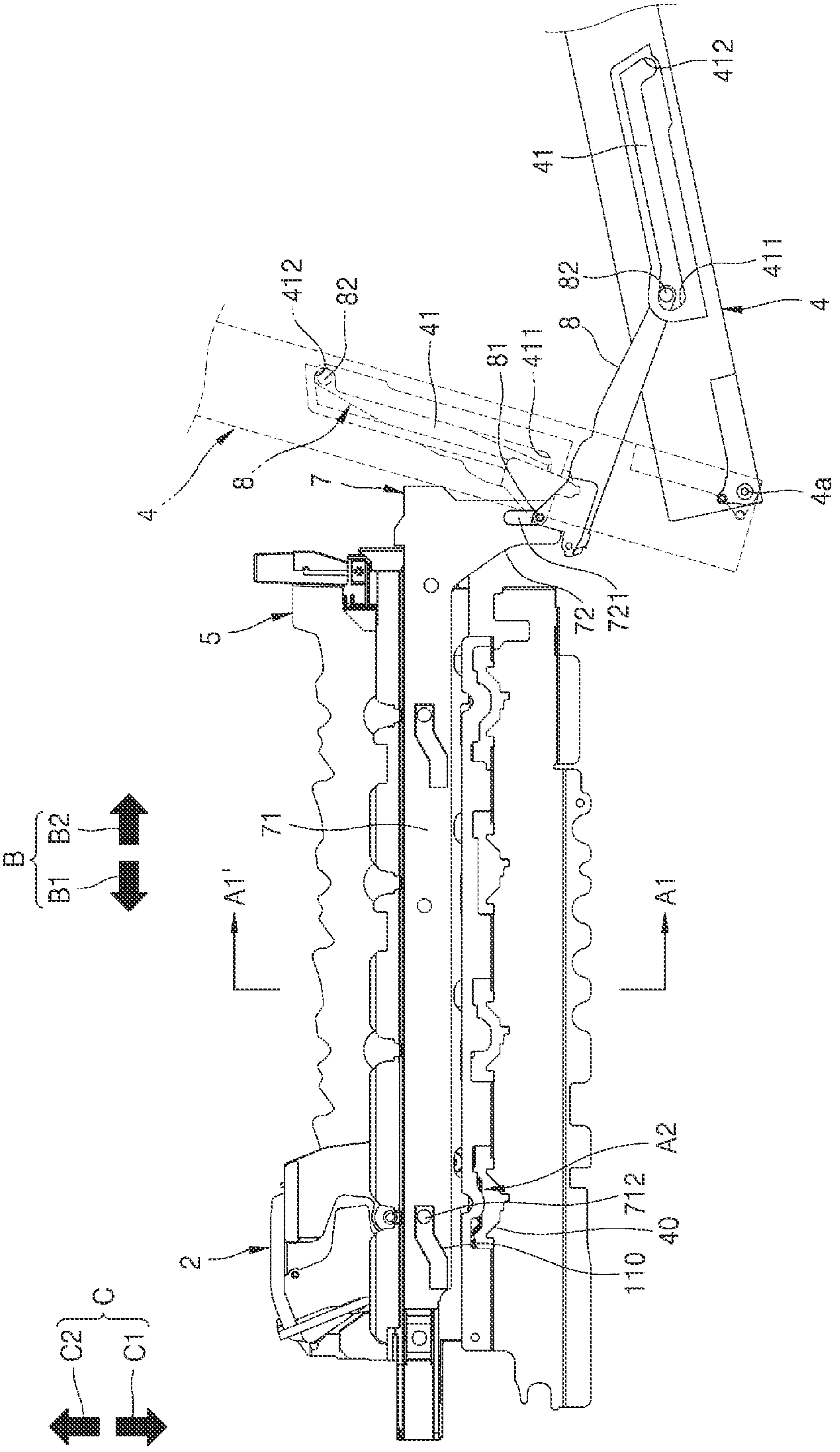
Figure 4:
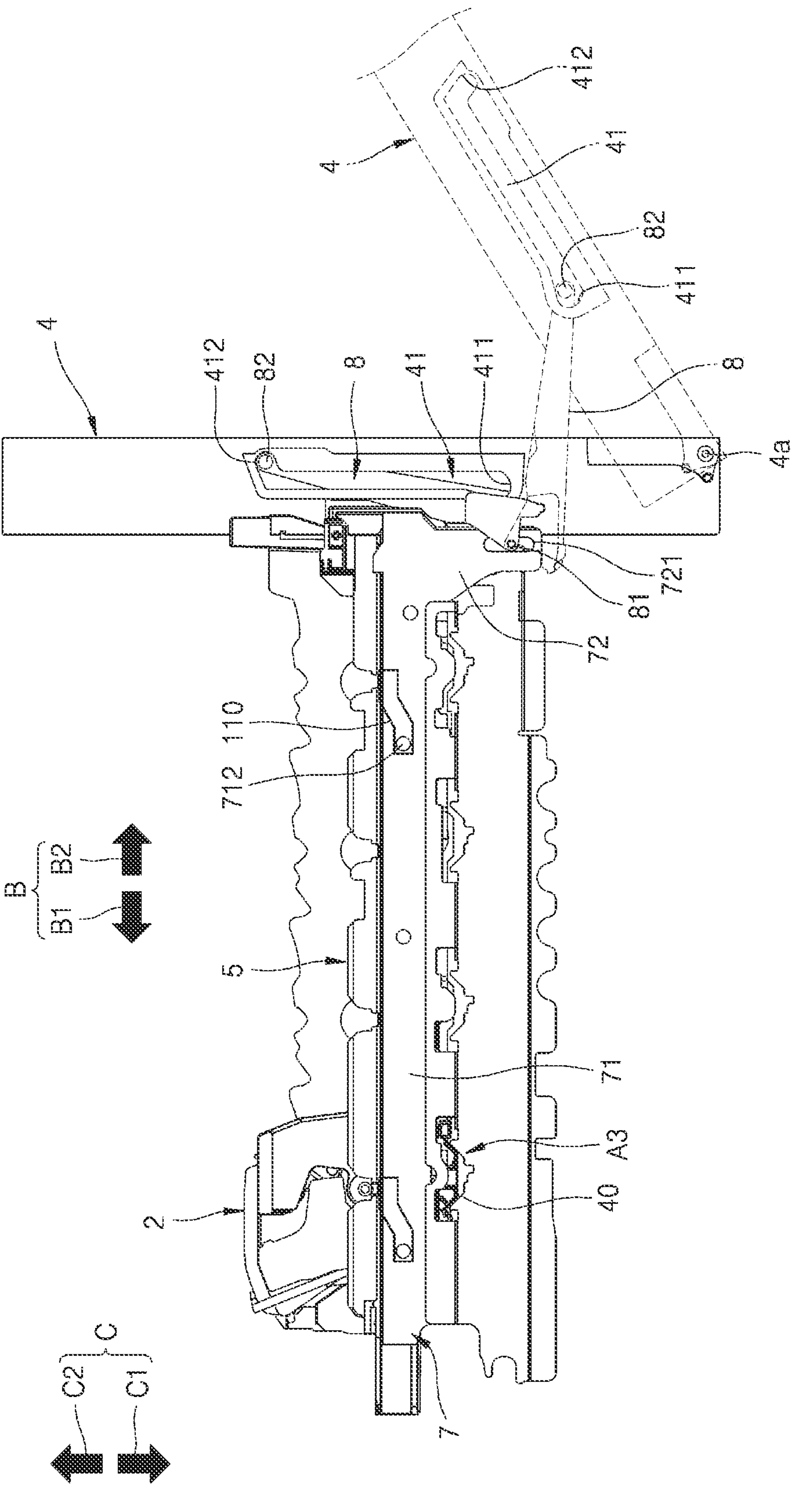

FIG. 1 is a schematic diagram of an electrophotographic image forming apparatus according to an example. FIG. 2 is a perspective view illustrating a method of mounting/removing a development cartridge on/from a main body according to an example. FIGS. 3 and 4 are side views illustrating a structure in which a tray moves between a mounting position and an accommodation position in conjunction with an opening and closing operation of a door according to an example, wherein FIG. 3 illustrates the door that is opened and the tray that is positioned at the mounting position, and FIG. 4 illustrates the door that is closed and the tray that is positioned at the accommodation position.

Referring to FIGS. 1 to 4, an image forming apparatus includes a main body 1 including an opening 3, a door 4 that opens and closes the opening 3, an accommodation portion 40, a tray 5 on which a development cartridge 2 may be mounted and which is movable between a withdrawal position 5*a* and a mounting position 5*b* through the opening 3, an elevating guide member 7 that may be elevated to a first position at which the tray 5 is supported to slide between the withdrawal position 5*a* and the mounting position 5*b* and a second position at which the development cartridge 2 may be accommodated in the accommodation portion 40 in conjunction with an opening and closing operation of the door 4, and an elastic support member 20 that elastically supports the development cartridge 2 with respect to the tray 5.

Referring to FIG. 1, the image forming apparatus may print a color image electrophotographically. As illustrated in FIG. 1, the image forming apparatus may include the main body 1 and the development cartridge 2 attachable to and detachable from the main body 1. The main body 1 may include an exposure unit 13, a transfer unit, and a fixing unit 15. The development cartridge 2 may be an integral development cartridge including a developing roller 22 and a photoconductive drum 21. The development cartridge 2 may include a plurality of development cartridges 2C, 2M, 2Y, and 2K for forming toner images of cyan, magenta, yellow, and black colors, respectively.

The photoconductive drum 21 is an example of a photoconductor on a surface of which an electrostatic latent image may be formed, and may include a conductive metal pipe and a photoconductive layer formed on the outer circumference thereof. A charging roller 23 is an example of a charger that is to charge the photoconductive drum 21 to have a uniform surface electric potential. A cleaning member 25 is to remove a developer remaining on the surface of the photoconductive drum 21 after an intermediate transfer process to be described later. The exposure unit 13 is to scan the photoconductive drum 21 with light that is modulated in correspondence with image information to form an electrostatic latent image on the surface of the photoconductive drum 21. A developing bias voltage to develop the toner with the photoconductive drum 21 may be applied to the developing roller 22. Therefore, visible toner images of different colors may be formed on surfaces of the plurality of photoconductive drums 21 of the plurality of development cartridges 2. The transfer unit is to transfer the toner images formed on the plurality of photoconductive drums 21 to a printing medium P. In an example, an intermediate transfer type transfer unit is employed. As an example, the transfer unit may include an intermediate transfer belt 31, a plurality of intermediate transfer rollers 32 positioned opposite to the plurality of photoconductive drums 21 with the intermediate transfer belt 31 interposed therebetween, a transfer roller 33, and a driving roller 34. When an intermediate transfer bias voltage is applied to the plurality of intermediate transfer rollers 32, the toner images developed on the plurality of photoconductive drums 21 are intermediately transferred to the intermediate transfer belt 31. The transfer roller 33 is positioned to face the intermediate transfer belt 31. The printing medium P loaded on a paper feeding means 17 is conveyed between the transfer roller 33 and the intermediate transfer belt 31. The toner image intermediately transferred onto the intermediate transfer belt 31 is transferred to the printing medium P by the transfer bias voltage applied to the transfer roller 33. When the printing medium P passes through the fixing unit 15, the toner image is fixed to the printing medium P by heat and pressure. The printing medium P having the fixed image is discharged by a discharge roller 19.

During different conditions, for example when the developer such as toner contained in the development cartridge 2 is consumed, the development cartridge 2 may be replaced with a new development cartridge 2. The development cartridge 2 may be mounted/removed on/from the main body 1 through the opening 3 opened by the door 4. FIGS. 1 and 2 illustrate the tray 5 on which the development cartridge 2 may be mounted and which is movable between the withdrawal position 5*a* withdrawn from the main body 1 and the mounting position 5*b* inserted into the main body 1. For example, the development cartridge 2 may be mounted on the tray 5 by opening the door 4 and sliding the tray 5 in a withdrawal direction B2 to be positioned at the withdrawal position 5*a*. The tray 5 may slide in a mounting direction B1 to be positioned at the mounting position 5*b* and the door 4 may be closed. In order to prevent damage of photoconductive drum 21 and the intermediate transfer belt 31 due to a contact between the photoconductive drum 21 and the intermediate transfer belt 31 during a process of moving the tray 5 between the mounting position 5*b* and the withdrawal position 5*a*, the development cartridge 2 may be supported on the tray such that the photoconductive drum 21 is spaced apart from the intermediate transfer belt 31 while the tray 5 moves between the withdrawal position 5*a* and the mounting position 5*b*.

In order for an image transfer process to be smoothly performed, the photoconductive drum 21 may contact the intermediate transfer belt 31. To this end, in conjunction with the opening and closing operation of the door 4, the tray 5 may move between the mounting position 5*b* and the accommodation position 5*c* for moving the development cartridge 2 to a position at which the photoconductive drum 21 and the intermediate transfer belt 31 are in contact with each other. For example, the tray 5 may slide from the withdrawal position 5*a* in the mounting direction B1 to move to the mounting position 5*b*. When the tray 5 is positioned at the mounting position 5*b* and the door 4 is closed, the tray 5 moves in a downward direction C1 in conjunction with the closing operation of the door 4. The development cartridge 2 moves together with the tray 5 in the downward direction C1. When the development cartridge 2 is accommodated in the accommodation portion 40 provided in the main body 1, the photoconductive drum 21 comes into contact with the intermediate transfer belt 31 and the development cartridge 2 does not descend further. The tray 5 further descends slightly after the development cartridge 2 is accommodated in the accommodation portion 40 to reach the accommodation position 5*c*. When the door 4 is opened, the tray 5 moves in an upward direction C2 such that the development cartridge 2 is spaced apart from the accommodation portion 40 and the photoconductive drum 21 is spaced apart from the intermediate transfer belt 31. The tray 5 reaches the mounting position 5*b*. In this state, the tray 5 may slide in the withdrawal direction B2 to be withdrawn from the main body 1 as shown in FIG. 2.

An example of a structure in which the tray 5 may be elevated to the mounting position 5*b* and the accommodation position 5*c* in conjunction with the opening and closing operation of the door 4 will be described. FIGS. 3 and 4 illustrate, in conjunction with the opening and closing operation of the door 4, the elevating guide member 7 that moves to the first position (FIG. 3) at which the tray 5 is supported to slide between the withdrawal position 5*a* and the mounting position 5*b* and the second position (FIG. 4) at which the development cartridge 2 is accommodated in the accommodation portion 40. The tray 5 is supported by the elevating guide member 7 so as to slide between the withdrawal position 5*a* and the mounting position 5*b*. For example, the elevating guide member 7 may include a sliding support portion 71 extending in a detachment direction B to support the tray 5 so as to slide, and a connection portion 72 connected to the door 4. A link 8 connects the door 4 and the elevating guide member 7.

Figure 5:
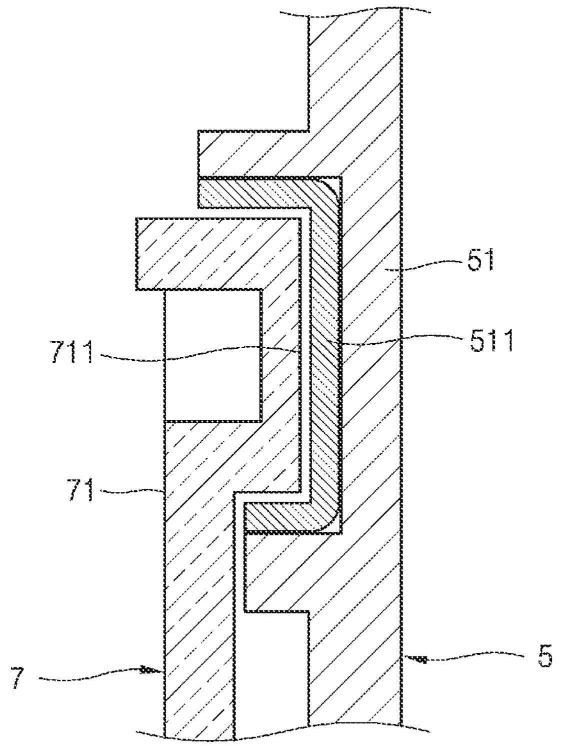
FIG. 5 is a cross-sectional view taken along line A1-A1' of FIG. 3 according to an example.

FIG. 5 is a cross-sectional view taken along line A1-A1' of FIG. 3 according to an example.

Referring to FIG. 5, a first rail 711 may be provided on the sliding support portion 71, and a second rail 511 supported by the first rail 711 may be provided on a side wall 51 of the tray 5. For example, the first rail 711 may have a convex shape, and the second rail 511 may have a concave shape to accommodate the first rail 711. According to an example, the tray 5 may be supported by the elevating guide member 7 and slide between the withdrawal position 5*a* and the mounting position 5*b*.

A first connection groove 721 extending in an elevating direction C may be provided in the connection portion 72. A first connection protrusion 81 for insertion into the first connection groove 721 may be provided on one end of the link 8. A second connection groove 41 may be provided in the door 4. A second connection protrusion 82 for insertion into the second connection groove 41 may be provided on the other end of the link 8. The second connection groove 41 includes a first end 411 and a second end 412. The first end 411 is an end close to a rotation center 4*a* of the door 4, and the second end 412 is an end away from the rotation center 4*a* of the door 4.

The elevating guide member 7 may be supported on the main body 1 so as to slide in the detachment direction B in conjunction with an opening and closing operation of the door 4. For example, a guide protrusion 712 may be provided on the sliding support portion 71. A guide slot 110 on which the guide protrusion 712 is slidably supported may be provided in the main body 1. The guide slot 110 may have a shape by which the elevating guide member 7 is elevated in the downward direction C1 and the upward direction C2 respectively as the elevating guide member 7 slides in the mounting direction B1 and the withdrawal direction B2.

Figure 6:
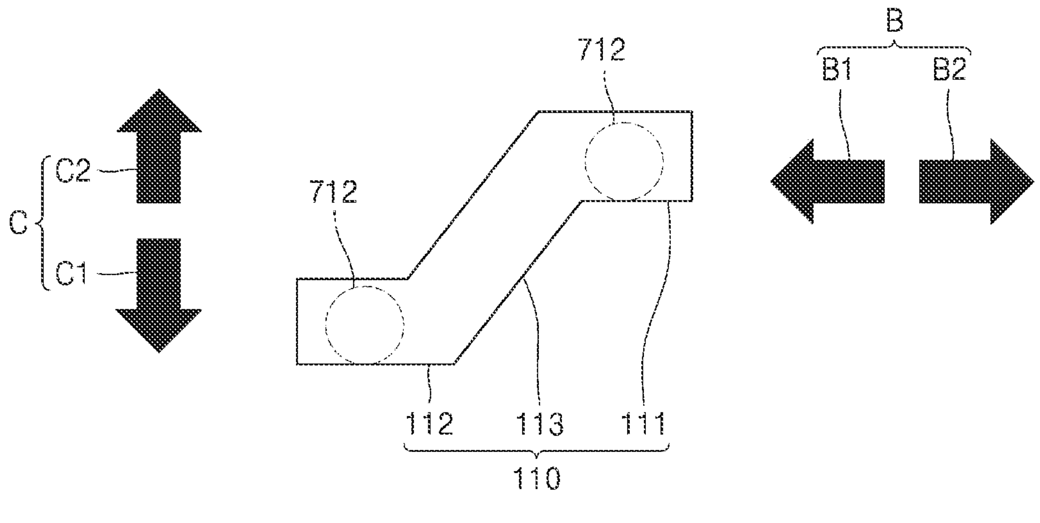
FIG. 6 illustrates a guide slot shown in FIGS. 3 and 4 according to an example.

FIG. 6 illustrates a guide slot shown in FIGS. 3 and 4 according to an example.

Referring to FIG. 6, the guide slot 110 may include a first slot 111, a second slot 112 stepped from the first slot 111 in the downward direction C1, and a third slot 113 connecting the first slot 111 and the second slot 112. When the door 4 is opened, the guide protrusion 712 is supported by the first slot 111. As the door 4 is closed and the elevating guide member 7 moves in the mounting direction B1, the guide protrusion 712 moves from the first slot 111 and is guided to the third slot 113. Accordingly, the elevating guide member 7 moves in the downward direction C1. When the door 4 is closed, the guide protrusion 712 is supported by the second slot 112. When the door 4 is opened, as the elevating guide member 7 moves in the withdrawal direction B2, the guide protrusion 712 moves from the second slot 112 and is guided to the third slot 113. Accordingly, the elevating guide member 7 moves in the upward direction C2. When the door 4 is opened, the guide protrusion 712 is supported by the first slot 111.

Figure 7:
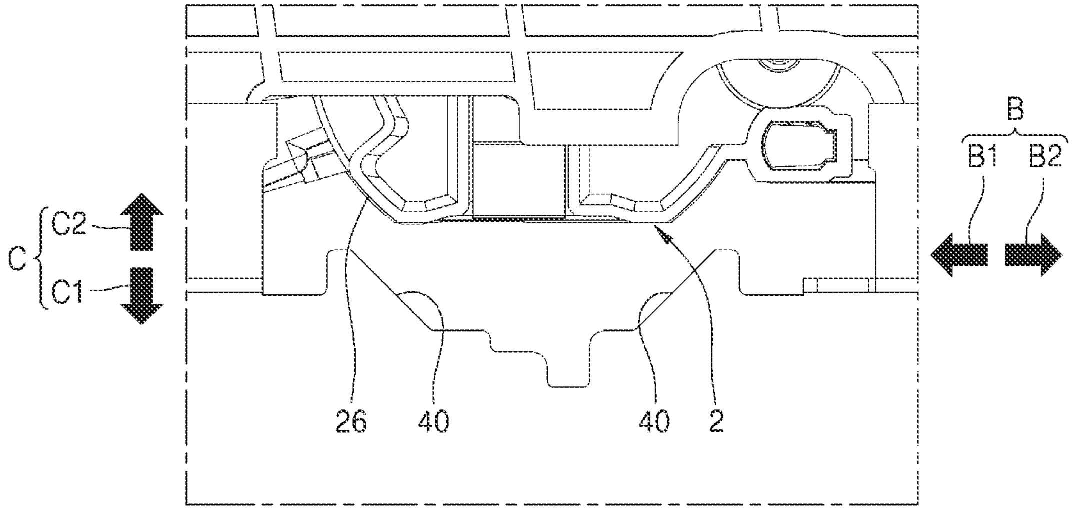
FIG. 7 is a view of part A2 of FIG. 3 according to an example.
Figure 8:
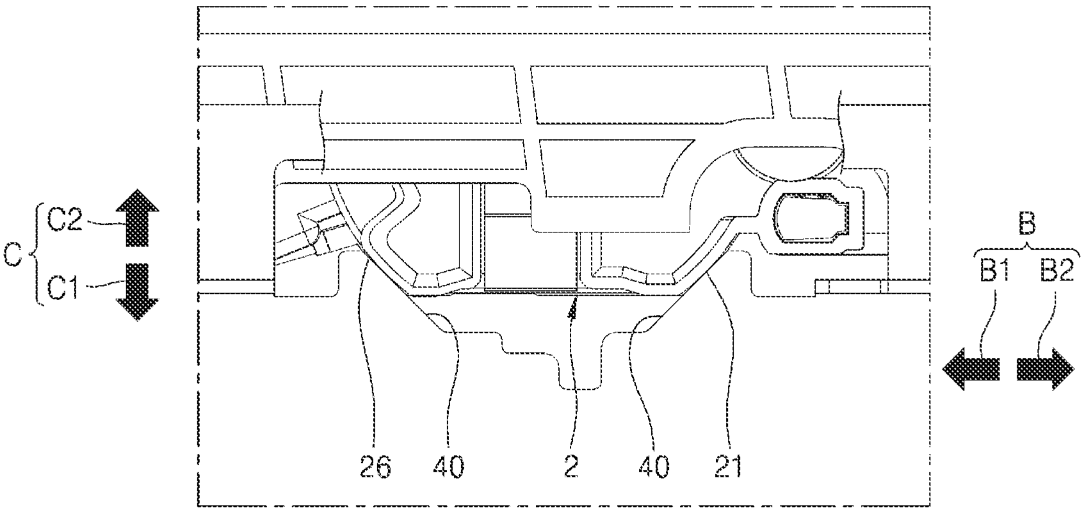
FIG. 8 is a view of part A3 of FIG. 4 according to an example.

FIG. 7 is a view of part A2 of FIG. 3 according to an example, and FIG. 8 is a view of part A3 of FIG. 4 according to an example.

Referring to FIGS. 7 and 8, an example process in which the development cartridge 2 is accommodated in the accommodation portion 40 as the tray 5 moves between the mounting position 5*b* to the accommodation position 5*c* will be described. Referring to FIG. 7, a positioning portion 26 is provided in the development cartridge 2. The positioning portion 26 may have a shape complementary to the accommodation portion 40. In an example, the positioning portion 26 has a convex shape and the accommodation portion 40 has a concave shape to accommodate the positioning portion 26. While the tray 5 is positioned at the mounting position 5*b*, the development cartridge 2 is spaced apart from the accommodation portion 40 in the upward direction C2. Accordingly, the photoconductive drum 21 is spaced apart from the intermediate transfer belt 31.

When the door 4 rotates between an open position and a closed position, the elevating guide member 7 is guided to the guide slot 110 while moving in the mounting direction B1 to move in the downward direction C1. The tray 5 is supported on the elevating guide member 7 to slide in the detachment direction B. When the tray 5 reaches the mounting position 5*b*, the tray 5 contacts a stopper (not shown) that is provided in the main body 1, and thus the tray 5 may not move beyond the mounting position 5*b* in the mounting direction B1. Accordingly, the tray 5 does not move in the mounting direction B1 but moves in the downward direction C1 together with the elevating guide member 7. The development cartridge 2 moves in the downward direction C1 together with the tray 5, and, as shown in FIG. 8, the positioning portion 26 contacts the accommodation portion 40. Thereby, the development cartridge 2 is accommodated in the accommodation portion 40 and the photoconductive drum 21 is in contact with the intermediate transfer belt 31. After the development cartridge 2 is accommodated in the accommodation portion 40, the elevating guide member 7 and the tray 5 further move in the downward direction C1.

When the door 4 rotates between the closed position and the open position, the elevating guide member 7 is guided to the guide slot 110 while moving in the withdrawal direction B2 to move in the upward direction C2. The tray 5 does not move in the withdrawal direction B2 but moves in the upward direction C2 together with the elevating guide member 7. The development cartridge 2 moves in the upward direction C2 together with the tray 5, and as shown in FIG. 7 the positioning portion 26 is spaced apart from the accommodation portion 40. The photoconductive drum 21 is spaced apart from the intermediate transfer belt 31. The tray 5 reaches the mounting position 5*b*.

When the tray 5 moves between the withdrawal position 5*a*, the mounting position 5*b*, and the accommodation position 5*c*, the position of the development cartridge 2 with respect to the tray 5 is to remain stable. For example, the development cartridge 2 is stably supported on the tray 5 such that while the tray 5 moves, the position of the development cartridge 2 relative to the tray 5, that is, the position in the tray 5, should not change. An impact may be applied to the tray 5 while the tray 5 moves. The impact is likely to occur when the movement of the tray 5 stops. For example, when the tray 5 slides in the mounting direction B1 from the withdrawal position 5*a* to reach the mounting position 5*b*, the tray 5 is engaged with the stopper and stops at the mounting position 5*b*. At this time, an impact may be applied to the tray 5 by the stopper, and the development cartridge 2 may be shaken in the tray 5 due to the impact such that the position of the development cartridge 2 may change. When the tray 5 moves to the accommodation position 5*c* in this state, the development cartridge 2 may not be stably accommodated in the accommodation portion 40. In addition, when the tray 5 descends from the mounting position 5*b* and stops at the mounting position 5*c*, an impact may be applied to the tray 5, and thus the development cartridge 2 may be shaken and may not be stably accommodated in the accommodation portion 40. When the development cartridge 2 is not stably accommodated in the accommodation portion 40, a decrease in image density due to a transfer failure, a color registration error due to uneven spacing between the plurality of development cartridges 2, etc. may occur. In an example, the image forming apparatus may include an elastic support member 20 that elastically supports the development cartridge 2 with respect to the tray 5 while the tray 5 moves between the withdrawal position 5*a*, the mounting position 5*b*, and the accommodation position 5*c*. The elastic support member 20 may be implemented in various forms.

Figure 9:
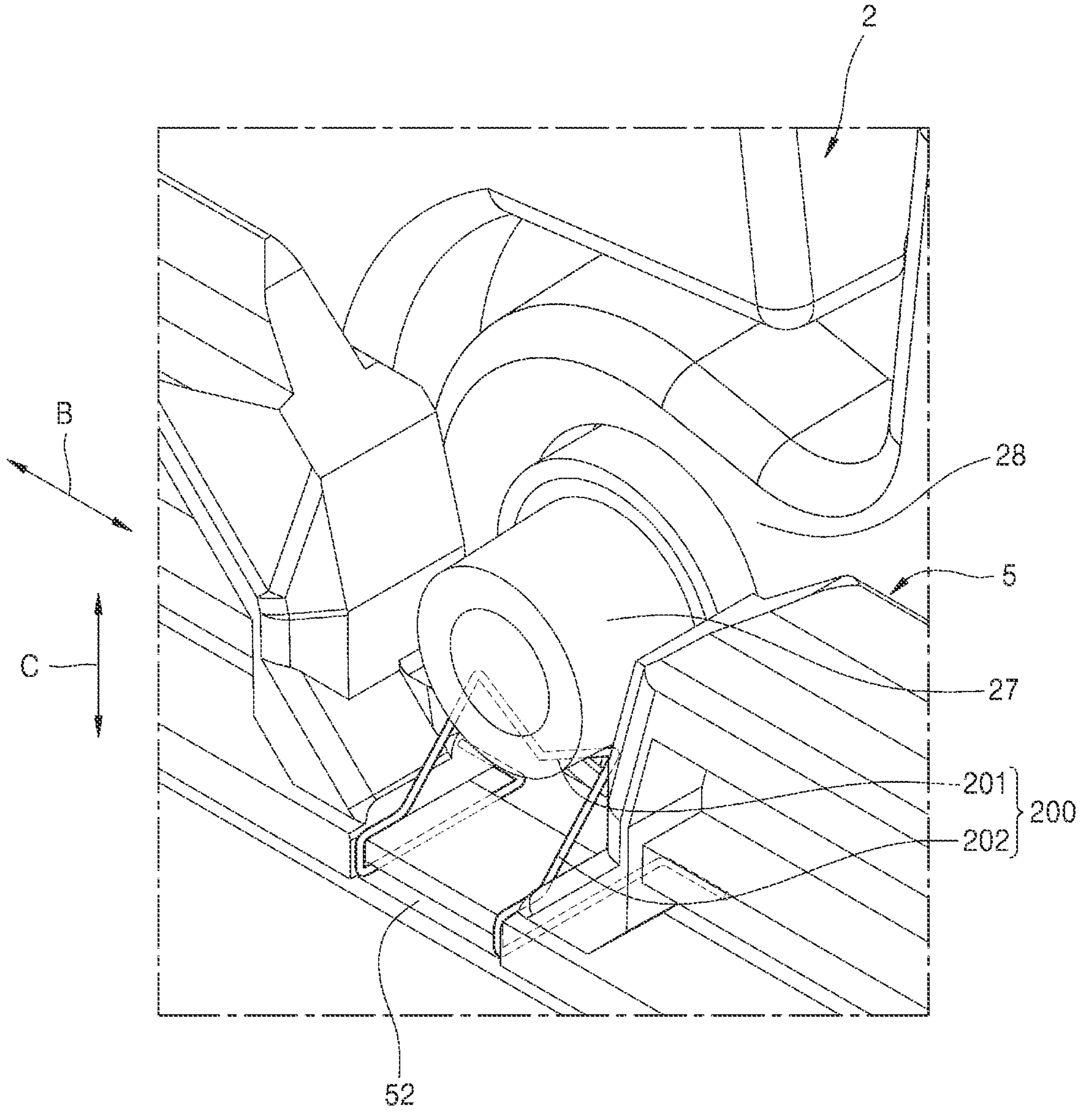
FIG. 9 is a partial perspective view illustrating an elastic support member according to an example.
Figure 10:
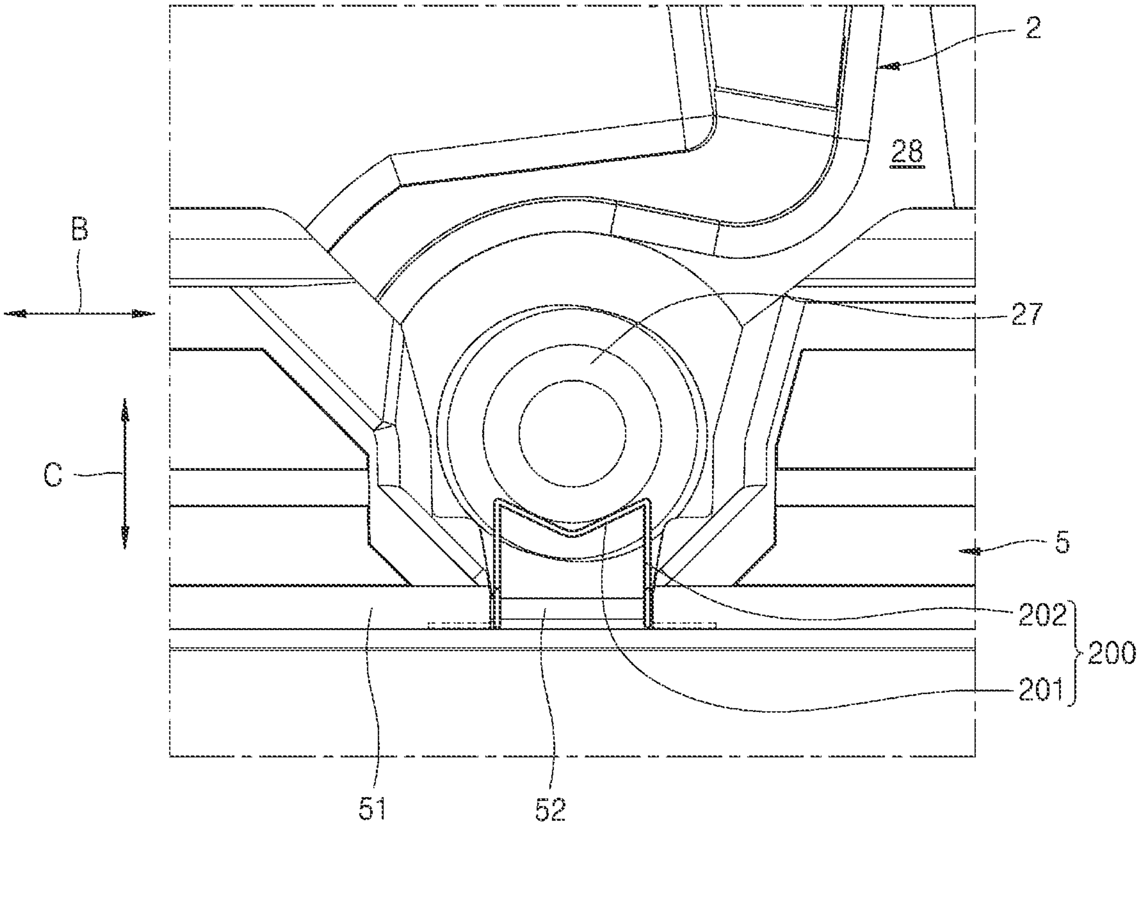
FIG. 10 is a side view of the elastic support member shown in FIG. 9 according to an example.

FIG. 9 is a partial perspective view illustrating an elastic support member according to an example. FIG. 10 is a side view of the elastic support member shown in FIG. 9 according to an example.

Referring to FIGS. 9 and 10, the development cartridge 2 may include a support protrusion 27 protruding from a side wall 28. The elastic support member may elastically support the support protrusion 27 with respect to the tray 5. The support protrusion 27 may have a cylindrical shape. The elastic support member may include an elastic wire 200 including a V-shaped support portion 201 on which the support protrusion 27 may be accommodated, and a coupling portion 202 extending from both ends of the support portion 201 and coupled to the tray 5. A coupling groove 52 into which the coupling portion 202 is inserted may be provided in the side wall 51 of the tray 5.

According to an example, when the development cartridge 2 is mounted on the tray 5, the support protrusion 27 is supported by the support portion 201 of the elastic wire 200. Because the support protrusion 27 is supported by two points in the detachment direction B by the V-shaped support portion 201, a positional change of the development cartridge 2 in the detachment direction B may be prevented. The elastic wire 200 elastically supports the support protrusion 27 even after the development cartridge 2 is accommodated in the accommodation portion 40. The elastic wire 200 may be elastically deformed in the detachment direction B and the elevating direction C. Impact applied to the tray 5 in the detachment direction B and the elevating direction C are buffered by the elastic wire 200. Accordingly, the impact transferred to the development cartridge 2 is alleviated or prevented, and thus the development cartridge 2 may be stably accommodated in the accommodation portion 40.

Referring to FIGS. 3 to 10, an example process in which the tray 5 moves between the mounting position 5*b* and the accommodation position 5*c* in conjunction with the opening and closing operation of the door 4 will be described. As shown by the solid line in FIG. 3, when the door 4 is opened, the second connection protrusion 82 of the link 8 is engaged with the first end 411 of the second connection groove 41. The tray 5 may slide in the withdrawal direction B2 to be positioned at the withdrawal position 5*a*, and the development cartridge 2 may be mounted on the tray 5. The support protrusion 27 of the development cartridge 2 is elastically supported by the elastic wire 200 as shown in FIG. 9. The tray 5 slides in the mounting direction B1 to be inserted into the main body 1. When the tray 5 reaches the mounting position 5*b*, the tray 5 comes into contact with a stopper and stops. At this time, an impact applied to the tray 5 is buffered by the elastic wire 200. Therefore, the position of the development cartridge 2 with respect to the tray 5 does not change. As shown in FIG. 7, because the positioning portion 26 of the development cartridge 2 is spaced apart from the accommodation portion 40, the photoconductive drum 21 does not contact the intermediate transfer belt 31.

While the tray 5 is positioned at the mounting position 5*b*, the door 4 may be closed. When the door 4 rotates to the closed position with respect to the rotation center 4*a*, the second connection protrusion 82 of the link 8 slides toward the second end 412 along the second connection groove 41. The link 8 rotates with respect to the first connection protrusion 81 inserted into the first connection groove 721 of the elevating guide member 7. The elevating guide member 7 does not move in the detachment direction B. When the door 4 continues to rotate, the second connection protrusion 82 of the link 8 reaches the second end 412 of the second connection groove 41 as shown by the dotted line in FIG. 3. In this state, when the door 4 continues to rotate in a closing direction, the second end 412 of the second connection groove 41 pushes the second connection protrusion 82 of the link 8 in the mounting direction B1. Because the first connection protrusion 81 of the link 8 is inserted into the first connection groove 721, the link 8 pushes the connection portion 72 of the elevating guide member 7 in the mounting direction B1. The elevating guide member 7 moves in the mounting direction B1. Because the tray 5 is in contact with the stopper, the tray 5 does not move in the mounting direction B1. Therefore, the position of the tray 5 in the detachment direction B does not change.

As shown in FIG. 6, the guide protrusion 712 provided on the elevating guide member 7 enters the third slot 113 from the first slot 111 of the guide slot 110, and the elevating guide member 7 moves in the downward direction C1 together with the tray 5. As shown in FIG. 8, the positioning portion 26 of the development cartridge 2 is accommodated in the accommodation portion 40. The elevating guide member 7 further moves in the mounting direction B1. The elevating guide member 7 and the tray 5 further move in the downward direction C1. Although the development cartridge 2 does not descend, the support portion 201 of the elastic wire 200 is elastically reconstructed with respect to the coupling portion 202, and the support portion 201 remains in contact with the support protrusion 27. When the door 4 is closed as shown by the solid line in FIG. 4, the guide protrusion 712 enters the second slot 112 and the tray 5 reaches the accommodation position 5*c*, as shown in FIG. 6. When the tray 5 reaches the accommodation position 5*c* and stops, an impact may be applied to the tray 5. When the impact is transferred to the development cartridge 2, the positioning portion 26 may be separated from the accommodation portion 40. According to an example, because the development cartridge 2 is elastically supported by the elastic wire 200, the impact is buffered by the elastic wire 200. Accordingly, the positioning portion 26 may remain stable while being accommodated in the accommodation portion 40, and positional stability of the development cartridge 2 in the main body 1 may be ensured.

The door 4 may be first opened in order to withdraw the tray 5 from the main body 1. As shown by the solid line in FIG. 4, when the door 4 is closed, the second connection protrusion 82 is engaged with the second end 412 of the second connection groove 41. In this state, when the door 4 rotates to an opened position with respect to the rotation center 4*a*, the second connection protrusion 82 slides toward the first end 411 along the second connection groove 41 and the link 8 rotates with respect to the first connection protrusion 81 inserted into the first connection groove 721 of the elevating guide member 7. When the door 4 continues to rotate, the second connection protrusion 82 of the link 8 reaches the first end 411 of the second connection groove 41 as shown by the dotted line in FIG. 4. When the door 4 continues to rotate in the opened direction, the first end 411 of the second connection groove 41 pulls the second connection protrusion 82 of the link 8 in the withdrawal direction B2. Because the first connection protrusion 81 of the link 8 is inserted into the first connection groove 721, the link 8 pulls the connection portion 72 of the elevating guide member 7 in the withdrawal direction B2. Accordingly, the elevating guide member 7 moves in the withdrawal direction B2. Because the tray 5 is in contact with the stopper, the tray 5 does not move in the withdrawal direction B2. Even though the elevating guide member 7 moves in the withdrawal direction B2, the position of the tray 5 in the detachment direction B does not change.

As shown in FIG. 6, the guide protrusion 712 provided on the elevating guide member 7 enters the third slot 113 from the second slot 112 of the guide slot 110. The elevating guide member 7 moves together with the tray 5 in the upward direction C2. As shown in FIG. 7, the positioning portion 26 of the development cartridge 2 is spaced apart from the accommodation portion 40. The photoconductive drum 21 is spaced apart from the intermediate transfer belt 31. When the door 4 is opened as shown by the solid line in FIG. 3, the guide protrusion 712 enters the first slot 111 and the tray 5 reaches the mounting position 5*b*, as shown in FIG. 6. In this state, the tray 5 may be pulled in the withdrawal direction B2 to move to the withdrawal position 5*a*.

The elastic support member may be implemented in various forms.

Figure 11:
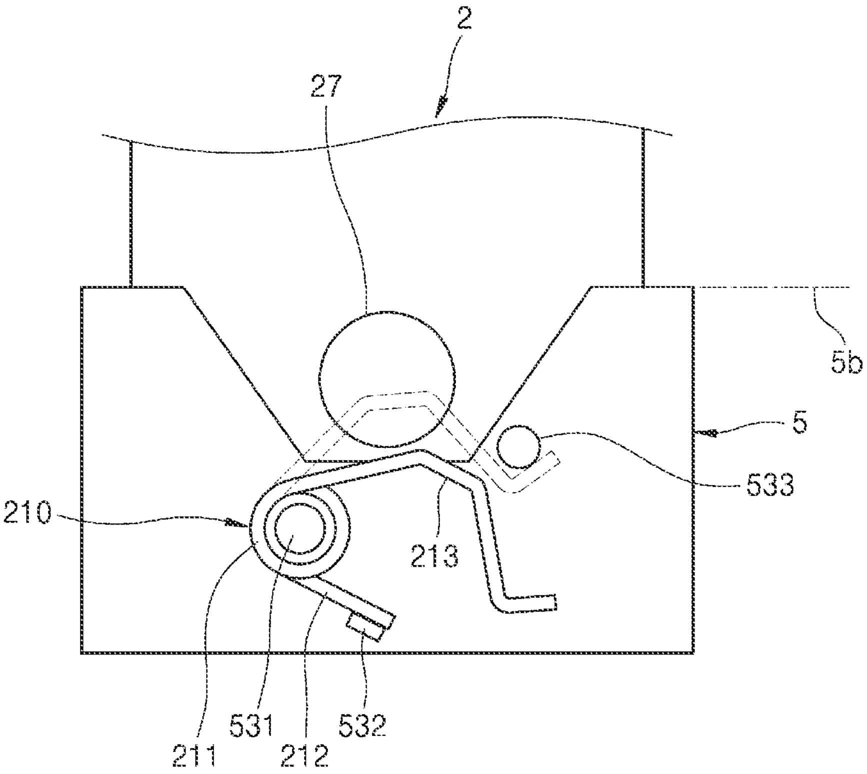
Figure 12:
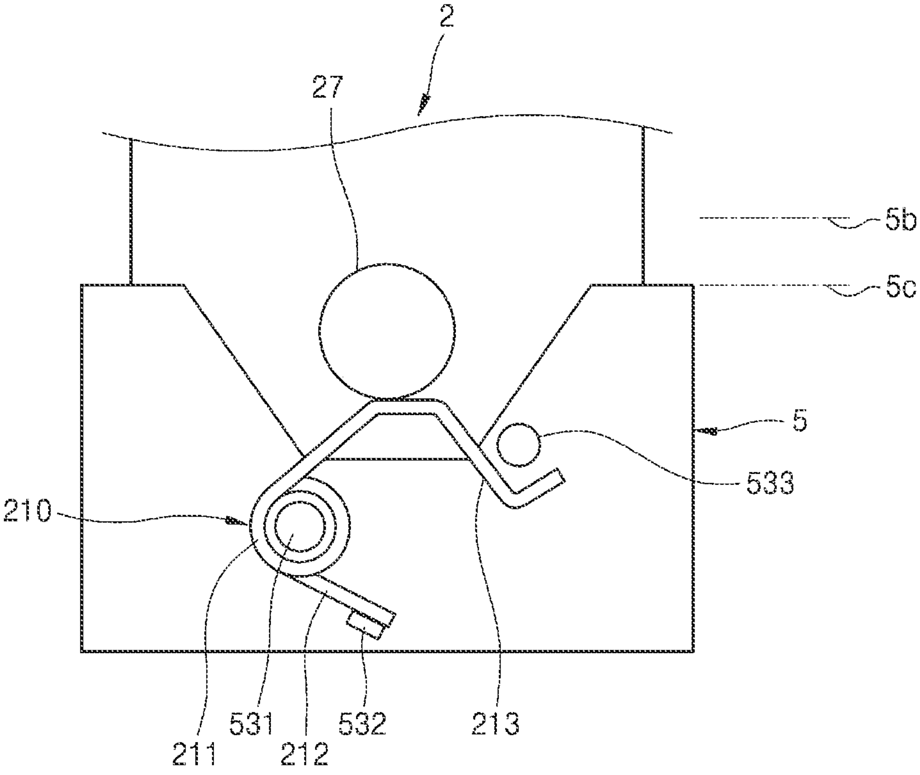

FIGS. 11 and 12 are schematic diagrams of an elastic support member according to an example, wherein FIG. 11 illustrates a tray positioned at a mounting position, and FIG. 12 illustrates the tray positioned at an accommodation position.

Referring to FIGS. 11 and 12, the elastic support member may include a torsion coil spring 210 including a winding portion 211 inserted into a protrusion 531 provided on the side wall 51 of the tray 5, a first arm 212 extending from the winding portion 211 and engaged with a first stopper 532 provided on the tray 5, and a second arm 213 extending from the winding portion 211 and elastically supporting the support protrusion 27 of the development cartridge 2. A second stopper 533 on which the second arm 213 may be engaged when the development cartridge 2 is removed from the tray 5 is provided on the tray 5.

While the development cartridge 2 is removed from the tray 5, the second arm 213 may be engaged with the second stopper 533 as shown by the dotted line in FIG. 11. Accordingly, the second arm 213 may be maintained in a position at which the support protrusion 27 is supported when the development cartridge 2 is mounted on the tray 5. When the development cartridge 2 is mounted on the tray 5, as shown in FIG. 11, the support protrusion 27 presses the second arm 213, and the second arm 213 is elastically compressed toward the first arm 212. The development cartridge 2 is elastically supported by the torsion coil spring 210. When the tray 5 reaches the accommodation position 5*c*, the development cartridge 2 is accommodated in the accommodation portion 40. Because the tray 5 is relatively spaced apart from the development cartridge 2, the second arm 213 is elastically deformed in a direction away from the first arm 212 to elastically support the support protrusion 27 as shown in FIG. 12.

Figure 13:
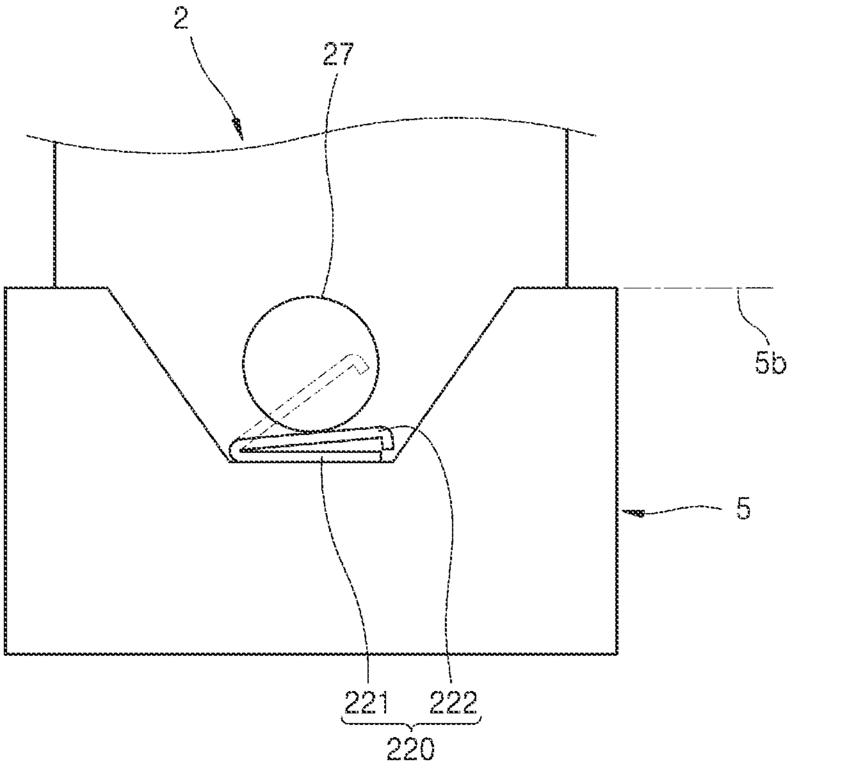
Figure 14:
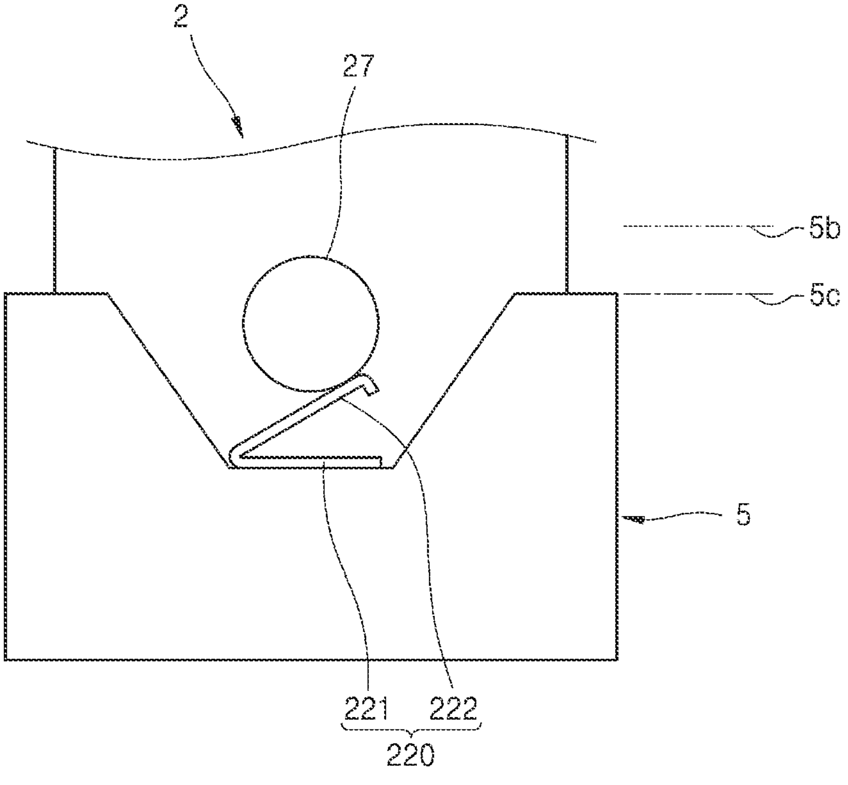

FIGS. 13 and 14 are schematic diagrams of an elastic support member according to an example, wherein FIG. 13 illustrates a tray positioned at a mounting position, and FIG. 14 illustrates the tray positioned at an accommodation position.

Referring to FIGS. 13 and 14, the elastic support member may include a plate spring 220 including a first portion 221 supported by the tray 5, and a second portion 222 bent from the first portion 221 to elastically support the support protrusion 27 of the development cartridge 2.

While the development cartridge 2 is removed from the tray 5, the second portion 222 is maximally unfolded from the first portion 221 as shown by a dotted line in FIG. 13. When the development cartridge 2 is mounted on the tray 5, as shown in FIG. 13, the support protrusion 27 presses the second portion 222, and the second portion 222 is compressed elastically toward the first portion 221 and elastically supports the development cartridge 2. When the tray 5 reaches the accommodation position 5*c*, the development cartridge 2 is accommodated in the accommodation portion 40. Because the tray 5 is relatively spaced from the development cartridge 2, as shown in FIG. 14, the second portion 222 is elastically unfolded in a direction away from the first portion 221 and elastically supports the support protrusion 27.

Figure 15:
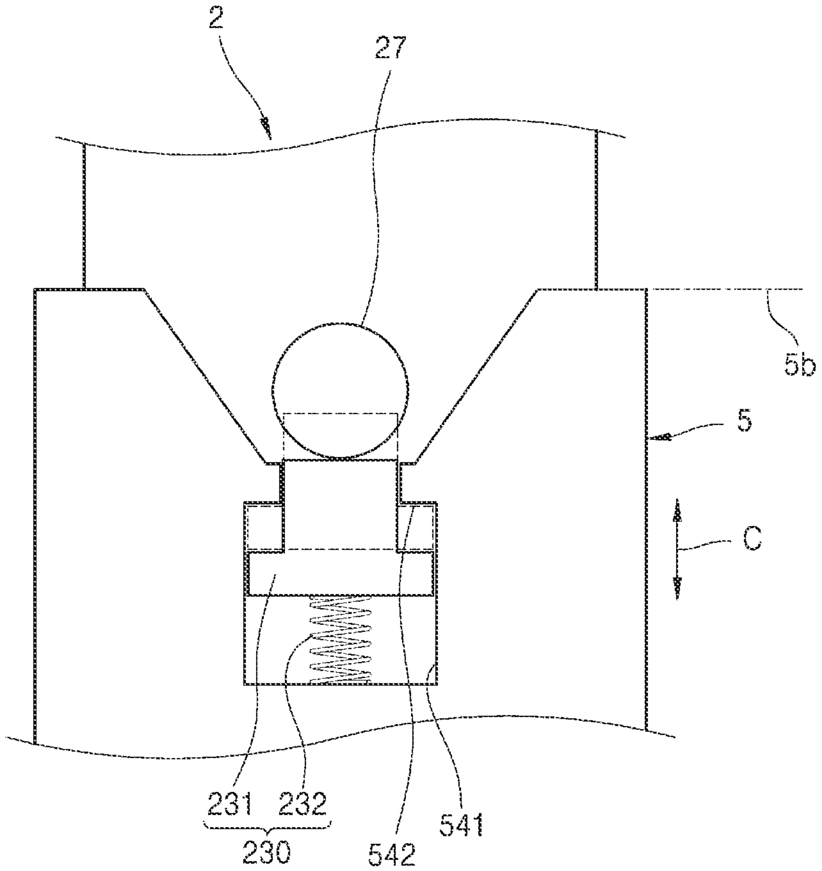
Figure 16:
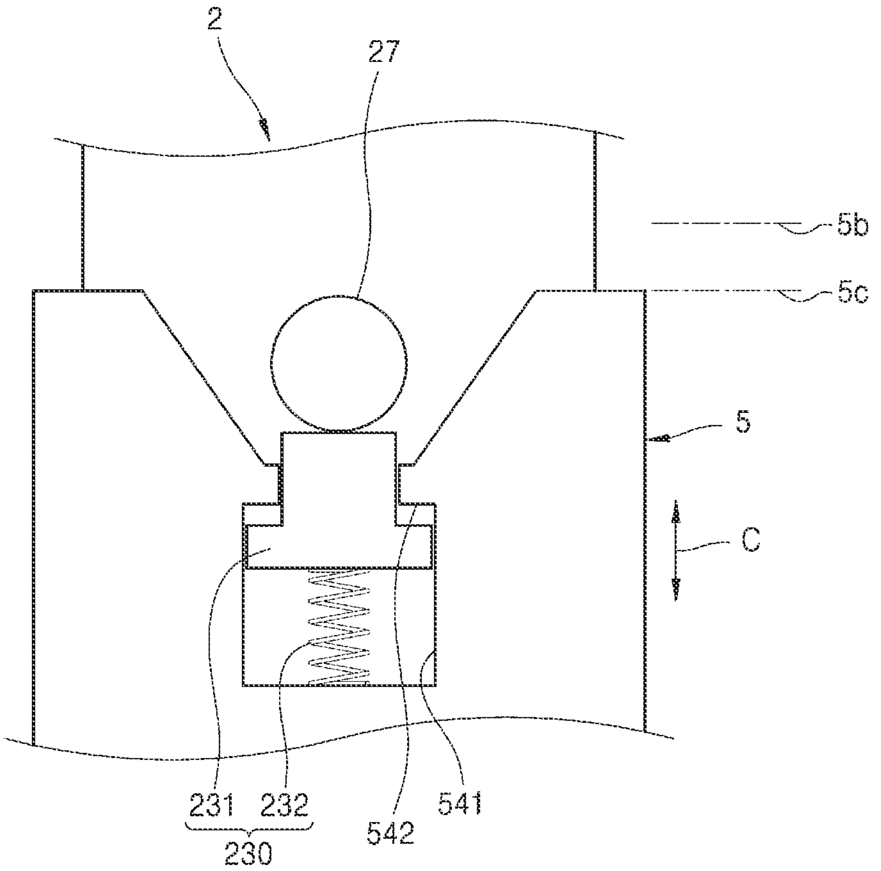

FIGS. 15 and 16 are schematic diagrams of an elastic support member according to an example, wherein FIG. 15 illustrates a tray positioned at a mounting position, and FIG. 16 illustrates the tray positioned at an accommodation position.

Referring to FIGS. 15 and 16, a first guide groove 541 facing the support protrusion 27 of the development cartridge 2 and extending in the elevating direction C may be provided in the tray 5. An elastic support member 230 may include a support member 231 installed in the first guide groove 541 so as to be elevated relative to the support protrusion 27 of the development cartridge 2, and an elastic member 232 to apply an elastic force in a direction in contact with the support protrusion 27 of the development cartridge 2 to the support member 231. The elastic member 232 may be implemented by, for example, a compression coil spring interposed between the tray 5 and the support member 231.

While the development cartridge 2 is removed from the tray 5, the support member 231 is positioned at a position shown by the dotted line in FIG. 15. A locking projection 542 on which the support member 231 may engage is provided in the tray 5 such that the support member 231 is not separated from the first guide groove 541. When the development cartridge 2 is mounted on the tray 5, as shown in FIG. 15, the support protrusion 27 presses the support member 231, and the elastic member 232 is elastically compressed. The development cartridge 2 is elastically supported by the elastic support member 230. When the tray 5 reaches the accommodation position 5*c*, the development cartridge 2 is accommodated in the accommodation portion 40. Because the tray 5 is relatively spaced from the development cartridge 2, as shown in FIG. 16, an amount of compression deformation of the elastic member 232 is reduced and the support member 231 is pushed by the elastic member 232. The development cartridge 2 is elastically supported by the elastic support member 230.

Figure 17:
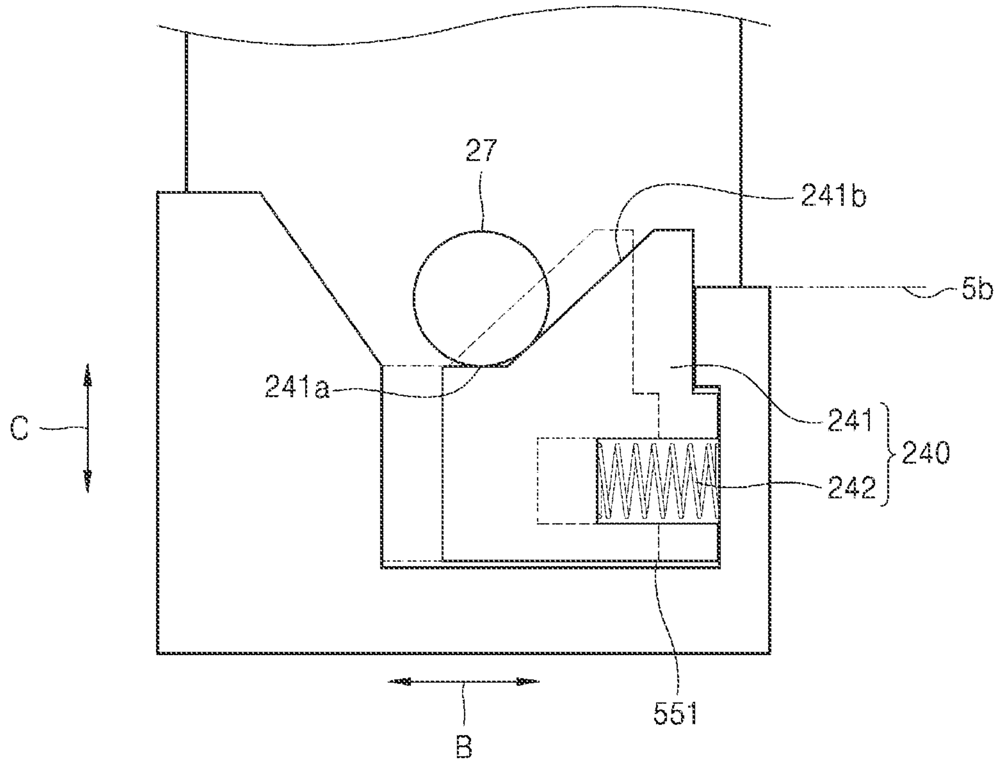
Figure 18:
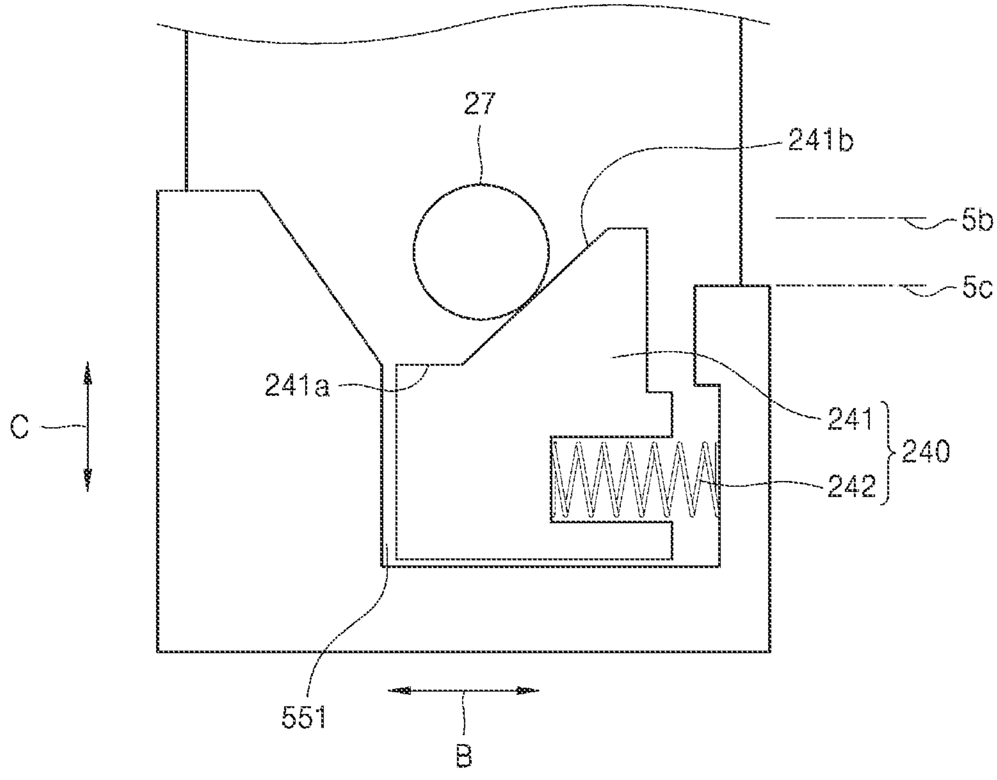

FIGS. 17 and 18 are schematic diagrams of an elastic support member according to an example, wherein FIG. 17 illustrates a tray positioned at a mounting position, and FIG. 18 illustrates the tray positioned at an accommodation position.

Referring to FIGS. 17 and 18, a second guide groove 551 facing the support protrusion 27 of the development cartridge 2 and extending in the detachment direction B may be provided in the tray 5. An elastic support member 240 includes a support member 241 including a first support portion 241*a* and a second support portion 241*b* that support the support protrusion 27 of the development cartridge 2, and an elastic member 242 to apply an elastic force to the support member 241. The support member 241 is supported in the second guide groove 551 so as to move in the detachment direction B. The first support portion 241*a* extends in the detachment direction B, and the second support portion 241*b* obliquely extends in the elevating direction C from the first support portion 241*a*. The elastic member 242 is to apply the elastic force in the detachment direction B to the support member 241 such that the second support portion 241*b* comes into contact with the support protrusion 27 of the development cartridge 2. The elastic member 242 may be implemented by, for example, a compression coil spring interposed between the tray 5 and the support member 241.

While the development cartridge 2 is removed from the tray 5, the support member 241 is positioned at the position shown by the dotted line in FIG. 17. The position shown by the dotted line may be a position at which the support protrusion 27 of the development cartridge 2 contacts the second support portion 241*b* when the development cartridge 2 is mounted on the tray 5. When the development cartridge 2 is mounted on the tray 5, the support protrusion 27 of the development cartridge 2 presses the second support portion 241*b*. Because the second support portion 241*b* has an inclination, the support member 241 is pushed in a direction opposite to the elastic force of the elastic member 242. As the elastic member 242 is compressed, the support protrusion 27 of the development cartridge 2 is supported at two points by the first support portion 241*a* and the second support portion 241*b* as shown in FIG. 17. The development cartridge 2 is elastically supported by the elastic support member 240. When the tray 5 reaches the accommodation position 5*c*, the development cartridge 2 is accommodated in the accommodation portion 40. Because the tray 5 is relatively spaced from the development cartridge 2, as shown in FIG. 18, an amount of compression deformation of the elastic member 242 is reduced, and the support member 241 is slightly pushed in the direction of the elastic force of the elastic member 242. The support protrusion 27 of the development cartridge 2 is in contact with the second support portion 241*b*, and the development cartridge 2 is elastically supported by the elastic support member 240.

Referring again to FIG. 2, one of both ends 2*a* and 2*b* in the width direction of the development cartridge 2 may be a driving end, and the other may be a non-driving end. For example, the end 2*a* may be the driving end, and the end 2*b* may be the non-driving end. The elastic support member described in FIGS. 9 to 18 may elastically support the driving end 2*a* and the non-driving end 2*b*. In this case, the support protrusion 27 is provided on each of the driving end 2*a* and the non-driving end 2*b*. As another example, the non-driving end 2*b* may be elastically supported with respect to the tray 5 by the aforementioned elastic support member, and the driving end 2*a* may be non-elastically supported by a non-elastic support member. Non-elastically supporting may mean that the development cartridge 2 and the tray 5 remain in contact with each other by the non-elastic support member when the tray 5 is elevated between the mounting position 5*b* and the accommodation position 5*c*.

Referring to FIG. 2, the non-elastic support member may include a first contact member 561 provided on the tray 5 and a second contact member 24 provided on the driving end 2*a* of the development cartridge 2 in contact with the first contact member 561 so as to be elevated as the tray 5 is elevated to the mounting position 5*b* and the accommodation position 5*c*.

Figure 19:
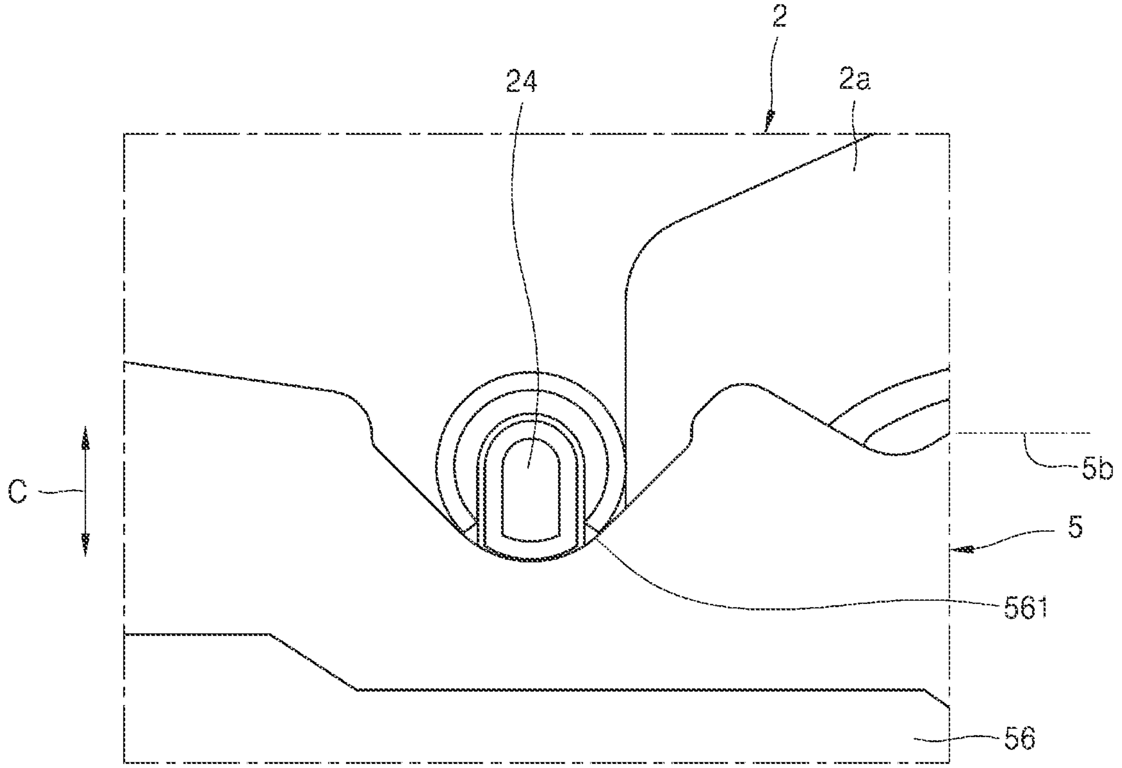
Figure 20:
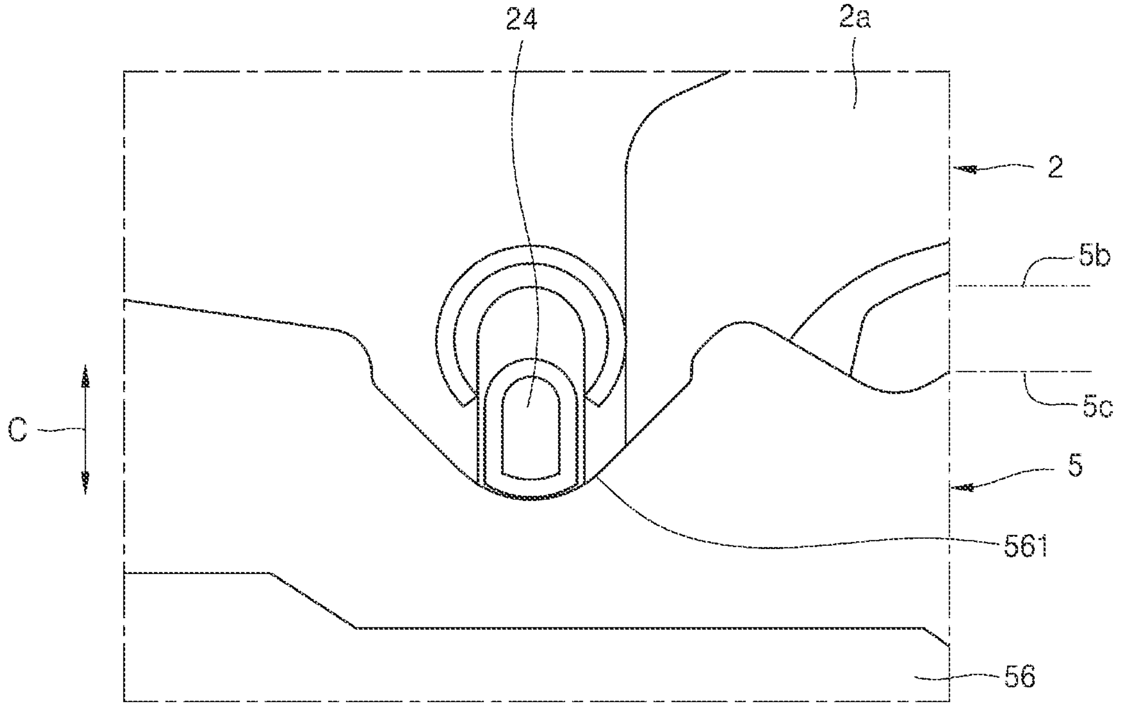

FIGS. 19 and 20 are side views illustrating a non-elastic support member according to an example, wherein FIG. 19 illustrates a tray positioned at a mounting position, and FIG. 20 illustrates the tray positioned at an accommodation position.

Referring to FIGS. 19 and 20, the first contact member 561 may be provided on, for example, the side wall 56 opposite to the driving end 2*a* of the development cartridge 2 among both side walls of the tray 5. The first contact member 561 may have a V-shape that is concave in the elevating direction C. The second contact member 24 may be supported by the driving end 2*a* of the development cartridge 2 so as to slide in the elevating direction C.

When the development cartridge 2 is mounted on the tray 5, the second contact member 24 comes into contact with the first contact member 561 as shown in FIG. 19. The second contact member 24 may be supported by two points by the first contact member 561. When the tray 5 reaches the accommodation position 5*c*, the development cartridge 2 is accommodated in the accommodation portion 40. The tray 5 further falls even after the development cartridge 2 is mounted on the mounting portion 40, and as shown in FIG. 20, the second contact member 24 slides with respect to the development cartridge 2 in the downward direction C1 while contacting the first contact member 561. Even when the tray 5 reaches the accommodation position 5c, the second contact member 24 remains in contact with the first contact member 561. The second contact member 24 remains supported by two points by the first contact member 561 while the tray 5 is elevated to the mounting position 5b and the mounting position 5c, and thus the position stability of the development cartridge 2 may be secured.

A coupling structure that is power-connected with the main body 1 when the development cartridge 2 is mounted on the main body 1 is provided in the driving end 2a. Therefore, it may not be easy to provide the above-described elastic support member including the support protrusion 27 on the driving end 2a. According to an example, by supporting the driving end 2a of the development cartridge 2 on the tray 5 by using a non-elastic support member of a simple structure, the position stability of the development cartridge 2 may be secured despite an impact that occurs during the movement of the tray 5.

It should be understood that examples described herein should be considered in a descriptive sense only and not for purposes of limitation. Descriptions of features or aspects within each example should typically be considered as available for other similar features or aspects in other examples. While one or more examples have been described with reference to the figures, it will be understood by those of ordinary skill in the art that various changes in form and details may be made therein without departing from the spirit and scope as defined by the following claims.

What is claimed is:

1. An image forming apparatus comprising:
- a main body comprising an opening, a door to open and close the opening, and an accommodation portion;
- a tray on which to mount a development cartridge, the tray being movable between a mounting position and a withdrawal position through the opening;
- an elevating guide member to be elevated to a first position, at which the tray is supported to slide between the mounting position and the withdrawal position, and a second position, at which the development cartridge is accommodated in the accommodation portion, in conjunction with an opening and closing operation of the door; and
- an elastic support member to prevent the development cartridge from being displaced due to an impact applied to the tray when the tray slides into the mounting position, wherein the elastic support member is elastically deformed in a detachment direction and an elevating direction to absorb the impact.

2. The image forming apparatus of claim 1,
- wherein the development cartridge comprises a support protrusion protruding from a side wall, and
- wherein the elastic support member is further to elastically support the support protrusion with respect to the tray.

3. The image forming apparatus of claim 2, wherein the elastic support member comprises an elastic wire comprising a V-shaped support portion on which the support protrusion is accommodated and a coupling portion extending from both ends of the support portion and coupled to the tray.

4. The image forming apparatus of claim 2, wherein the elastic support member comprises a torsion coil spring comprising a winding portion inserted into a protrusion of the tray, a first arm extending from the winding portion and engaged with a first stopper provided on the tray, and a second arm extending from the winding portion to elastically support the support protrusion.

5. The image forming apparatus of claim 2, wherein the elastic support member comprises a plate spring comprising a first portion supported by the tray and a second portion bent from the first portion to elastically support the support protrusion.

6. The image forming apparatus of claim 2,
- wherein a first guide groove facing the support protrusion and extending in the elevating direction of the tray is provided in the tray, and
- wherein the elastic support member comprises a support member installed in the guide groove to be elevated with respect to the support protrusion, and an elastic member to apply an elastic force to the support member in a direction in contact with the support protrusion.

7. The image forming apparatus of claim 2,
- wherein a second guide groove facing the support protrusion and extending in the detachment direction of the tray is provided in the tray, and
- wherein the elastic support member comprises:
  - a support member comprising a first portion extending in the detachment direction and a second portion extending obliquely in the elevating direction of the tray from the first portion, and supported in the second guide groove to move in the detachment direction; and
  - an elastic member to apply an elastic force in the detachment direction to the support member such that the second portion contacts the support member.

8. An image forming apparatus comprising:
- a main body comprising an opening, a door to open and close the opening, and an accommodation portion;
- a development cartridge comprising a driving end and a non-driving end;
- a tray on which to mount a development cartridge, the tray being movable between a mounting position and a withdrawal position through the opening;
- an elevating guide member to be elevated to a first position at which the tray is supported to slide between the mounting position and the withdrawal position, and a second position at which the development cartridge is accommodated in the accommodation portion, in conjunction with an opening and closing operation of the door;
- a non-elastic support member to non-elastically support the driving end of the development cartridge with respect to the tray; and
- an elastic support member to prevent the development cartridge from being displaced due to an impact applied to the tray when the tray slides into the mounting position, wherein the elastic support member is elastically deformed in a detachment direction and an elevating direction to absorb the impact.

9. The image forming apparatus of claim 8, wherein the elastic support member is to elastically support the non-driving end of the development cartridge with respect to the tray.

10. The image forming apparatus of claim 8, wherein the non-elastic support member comprises:
- a first contact member provided on the tray; and a second contact member provided on the non-driving end of the development cartridge in contact with the first contact member to be elevated as the elevating guide member is elevated.

11. An image forming apparatus comprising:

a main body comprising an opening and an accommodation portion;

a development cartridge detachable from the main body;

a tray on which to mount the development cartridge, the tray being movable between a mounting position inserted into the main body through the opening, a withdrawal position extracted from the main body, and an accommodation position at which the development cartridge is accommodated in the accommodation portion; and an elastic support member to prevent the development cartridge from being displaced due to an impact applied to the tray when the tray slides into the mounting position, wherein the elastic support member is elastically deformed in a detachment direction and an elevating direction to absorb the impact.

12. The image forming apparatus of claim 11, further comprising:

a door to open and close the opening, wherein the tray is to moves between the mounting position and the accommodation position in conjunction with an opening and closing operation of the door.

13. The image forming apparatus of claim 11, wherein the development cartridge comprises a driving end and a non-driving end, and wherein the elastic support member is to elastically support the non-driving end with respect to the tray.

14. The image forming apparatus of claim 13, further comprising a non-elastic support member to non-elastically support the driving end of the development cartridge with respect to the tray while the tray moves between the mounting position, the withdrawal position, and the accommodation position.

15. The image forming apparatus of claim 14, wherein the non-elastic support member comprises:

a first contact member provided on the tray; and a second contact member provided on the non-driving end of the development cartridge in contact with the first contact member to be elevated as the tray is elevated to the mounting position and the accommodation position.

* * * * *